O. W. FISKE.
MACHINE FOR MANUFACTURING PASTEBOARD.
No. 11,313.                 Patented July 11, 1854.
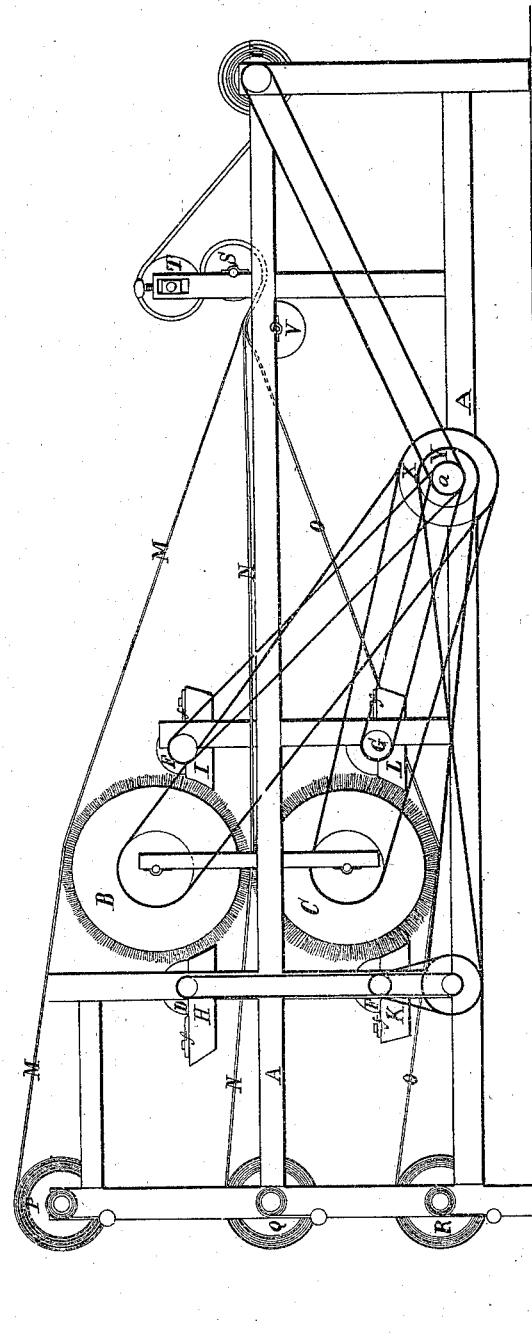

UNITED STATES PATENT OFFICE.

ORIN W. FISKE, OF DEDHAM, MASSACHUSETTS.

MACHINERY FOR MAKING PASTEBOARD.

Specification of Letters Patent No. 11,313, dated July 11, 1854.

*To all whom it may concern:*

Be it known that I, ORIN W. FISKE, of Dedham, in the county of Norfolk and State of Massachusetts, have invented a new or Improved Machine for the Manufacture of Pasteboard for Cards or other Articles; and I do hereby declare that the same is fully described and represented in the following specification and the accompanying drawing.

The object of my invention is to apply paste to three rolls of paper at one and the same time, and to bring and compress them together in the shape of pasteboard.

The drawing above mentioned represents a vertical end elevation of my said machine.

In the same B, and C, denote two cylindrical brushes which are placed one above the other, and in contact or nearly so. Each of these brushes works in contact with one or more, cylindrical paste rollers D, E, or F, G, arranged as seen in the drawings. Each of the said paste rollers is made to revolve in a suitable trough or box H, I, K, or L, for containing paste to which trough and roller, a doctor or scraper is applied in the usual way, to regulate the thickness of the paste taken up on the surface of the roller, the same being seen at *f*.

P, Q, R, represent three beams or rolls of paper arranged one above the other, and with their axes parallel to those of the cylinder brushes B, C. The frame A, serves to support the said beams or rolls, and the operative parts of the machine. From the said beams, three strips of paper M, N, O, are respectively taken, and led in contact with the peripheries of the paste brushes B, C, in the following way; that is to say. The first strip M, is carried over, and with its under surface in contact with the top surface of the upper brush B. The middle strip N, is carried between the two cylindrical brushes, and so that not only its upper surface may be in contact with the curved surface of the upper brush, but its lower surface at the same time be in contact with the upper curved surface of the lower brush. The lowest or third strip O, is carried underneath, and in contact with the lower brush C.

From the brushes the three strips are carried toward a guide bar or roller V, where they are brought into contact and all three made to pass together between two compressing rollers S, T, and from thence are led to and wound upon a beam or roller U.

The brushes paste rollers, and draft beam U, receive their rotary movements from a series of drums or pulley X, Y, *a*, fixed on a suitable driving shaft, to which rotary motion is to be given in any proper manner. From the said set of drums or pulleys, endless bands pass to and around other pulleys, respectively placed on the shafts of said brushes and rollers, or around intermediate pulleys connected with any one of such shafts by a belt and pulley, the same being in any suitable manner, to put them in revolution, to not only effect the proper application of the paste to the under surface of the upper strip of paper, to both surfaces of the middle strip, and to the upper surface of the upper strip, but the draft of the three strips from their respective rollers or beams.

What I claim as my invention is—

The combination and arrangement of the cylindric paste brushes, with three rolls or beams of paper, and compressing and draft rolls substantially as described, whereby the two cylindric brushes are made to apply at one operation the paste to the underside of the upper strip of paper, the two sides of the middle strip, and the upper side of the lower strip all as set forth.

In testimony whereof I have hereto set my signature, this seventh day of January A. D. 1853.

ORIN W. FISKE.

Witnesses:
WILLIAM T. RAND,
LORIN W. FISKE.